United States Patent [19]

Zampini

[11] 4,323,453
[45] Apr. 6, 1982

[54] TUBE SHEETS FOR PERMEATORS

[75] Inventor: Anthony Zampini, St. Louis, Mo.

[73] Assignee: Monsanto Company, St. Louis, Mo.

[21] Appl. No.: 209,806

[22] Filed: Nov. 25, 1980

Related U.S. Application Data

[63] Continuation-in-part of Ser. No. 109,428, Jan. 3, 1980, abandoned.

[51] Int. Cl.$^3$ ..................... B01D 31/00; B01D 13/00; B29C 6/04; B29F 1/10
[52] U.S. Cl. .................................. 210/321.1; 55/158; 210/321.3; 264/261; 264/263; 264/271.1; 264/328.14
[58] Field of Search .................. 528/94, 111; 428/292, 428/376, 398, 413; 210/321.1, 321.2, 321.3, 321.4, 321.5; 55/158

[56] References Cited

U.S. PATENT DOCUMENTS

| | | | |
|---|---|---|---|
| 3,228,876 | 1/1966 | Mahon | 210/321.3 |
| 3,329,652 | 7/1967 | Christie | 528/94 |
| 3,339,633 | 9/1967 | Richardson | 166/295 |
| 3,422,008 | 1/1969 | McLain | 210/321.5 |
| 3,499,062 | 3/1970 | Geary, Jr. et al. | 264/36 |
| 3,507,831 | 4/1970 | Avis et al. | 528/94 |
| 3,728,425 | 4/1973 | Schrader | 264/49 |
| 3,760,949 | 9/1973 | Carey et al. | 210/321.1 |
| 3,989,673 | 11/1976 | Jenkins et al. | 428/444 |
| 4,049,765 | 9/1977 | Yamazaki | 264/261 |
| 4,069,203 | 1/1978 | Carey et al. | 528/94 |
| 4,138,460 | 2/1979 | Tigner | 264/159 |

OTHER PUBLICATIONS

Chemical Week, New Cure for Epoxies, Jul. 31, 1965, pp. 47 and 48.
Farkas et al., "Imidazole Catalysis in the Curing of Epoxy Resins", Jour. Applied Polymer Science (1968), vol. 12, pp. 159-168.
Fike Chem. Co., Sales Brochure, "EMI-24 Curing Agent for Epoxy Resin Systems".
Glandt et al., "Cure and Transitions of an Imidazole/Epoxy System", Polymer Preprints ACS, Polymer Chem., (1975), 694-700.
Harding et al., "Mechan. Prop. of Epoxy Castings and Composites Cured with Ethyl Methyl Imidazole", Preprints ACS, Organ. Coatings and Plas. Chem., (1964), 24(2), 309-317.
Shell Chem. Co., "EPON Resins for Castings", pp. 66-70.
Ventrice, "Eval. of 2-Ethyl-4-methylimidazole as an Epoxy Resin Hardner", Div. Organ. Coatings and Plastics Chem., (1966), 26(2), 134-143.

*Primary Examiner*—William J. Van Balen
*Attorney, Agent, or Firm*—Thomas E. Kelley; Howard C. Stanley

[57] ABSTRACT

Tube sheets having a plurality of hollow fiber membranes suitable for fluid separations which are adapted to be provided in a fluid tight relationship within a permeator comprise a cured epoxy resin comprising polyglycidyl resin and imidazole curing agent. Methods are provided for making tube sheets.

32 Claims, No Drawings

TUBE SHEETS FOR PERMEATORS

This is a continuation-in-part of U.S. patent application Ser. No. 109,428, filed Jan. 3, 1980, now abandoned, incorporated herein by reference.

This invention relates to permeators containing hollow fiber membranes and more particularly to permeators having tube sheets comprised of solidified resin prepared from a polyglycidyl resin and an imidazole curing agent.

Permeators containing hollow fiber membranes are often advantageous in view of the high ratio of membrane surface area per unit volume of permeator which can be achieved. Consequently, permeators containing hollow fiber membranes may be of sufficiently compact size to find desirable application for many fluid separation operations such as gas-gas, gas-liquid, and liquid-liquid (including liquid-dissolved solids) separations.

In these permeators, at least one end of each of the hollow fiber membranes is embedded (often commonly referred to as potted) in a tube sheet, and the hollow fiber membranes extend in a fluid communication relationship through the tube sheet. One purpose of the tube sheet is to secure the hollow fiber membranes in an essentially fluid tight relationship within the tube sheet. The tube sheet may be secured in an essentially fluid tight relationship in the permeator such that fluid does not pass from one of the exterior side or bore side to the other side of a hollow fiber membrane except through the wall of the membrane. Even small leakages around the tube sheet can significantly adversely effect the performance of the permeator since non-permeating moieties can pass via these leakages to the permeate exit side of the hollow fiber membranes and reduce the selectivity of separation which can be achieved by the permeator. Another purpose of the tube sheet is to provide a sufficiently strong barrier to fluid flow that during operation conditions, the tube sheet does not rupture or otherwise lose its integrity such that fluid can pass through the tube sheet. Therefore, the tube sheet is more often of substantial thickness in order to ensure achieving a fluid tight relationship with the hollow fiber membranes and to ensure that the tube sheet can withstand any pressure differentials to which it may be subjected during the intended separation operation.

Generally, tube sheets are fabricated using a resin, which may be a natural or synthetic resin, which can be applied to the hollow fiber membranes which are then assembled into a bundle or can be cast around a previously assembled bundle of the hollow fiber membranes as a liquid and then solidified, e.g., by curing. Many unique considerations exist in the selection of a resin suitable for forming tube sheets. For instance, it is usually desired that:

1. The resin before and after solidification, sufficiently adhere to the hollow fiber membrane that the desired fluid tight relationship between the tube sheet and the hollow fiber membranes can be achieved;

2. The solidified resin exhibit sufficient strength and integrity to withstand the pressure differentials which are expected to exist across the tube sheet during intended separation operations;

3. The resin exhibit little shrinkage during solidifying such that undue internal stresses within the tube sheet do not occur and the solidified resin does not separate from the hollow fiber membranes or result in stresses on the hollow fiber membranes which adversely affect the integrity of the hollow fiber membranes;

4. The resin not unduly dissolve or otherwise adversely affect the material of the hollow fiber membranes;

5. The tube sheet exhibit a relative absence of internal stresses such as may be caused by differentials in temperature during solidifying, especially curing, the resin. (The propensity for such internal stresses to occur is increased in tube sheets having at least one region which does not contain hollow fiber membranes and hence may have different heat generation, heat absorption or heat transfer characteristics and possibly, different thermal expansion characteristics than a region containing hollow fiber membranes);

6. Especially with resins which polymerize (cure) during or after solidification, any heat evolved during the polymerization should not produce temperatures in the tube sheet which adversely affect the hollow fiber membranes and any heat required to initiate or to achieve a desired level of polymerization not adversely affect the hollow fiber membranes;

7. Especially when the tube sheet is cast around a previously assembled bundle of hollow fiber membranes, the viscosity of the liquid resin be sufficiently low that penetration of the liquid throughout the bundle can be readily achieved;

8. The liquid resin not be unduly drawn up between the hollow fiber membranes by capillary action (hereafter referred to as "wicking") and any wicking which may occur be relatively uniform across the cross-section of the bundle of hollow fiber membranes;

9. The tube sheet exhibit sufficient chemical resistance such that it maintains adequate strength and dimensional stability during intended separation operations;

10. The fabrication of the tube sheet be relatively non-complex and avoid the necessity to utilize complex equipment, and be capable of being fabricated with minimal fabrication residence time and with minimal manpower training, skill and time;

11. The solidified resin be capable of being severed or shaped to, e.g., expose the bores of the hollow fiber membranes or adapt the tube sheet for assembly of the permeator; and 12. The components of the resin not provide any undue toxicity risk during the formulation of the liquid resin, during the preparation of the tube sheet or after the preparation of the tube sheet.

The performance demanded of a tube sheet will depend upon the anticipated operating conditions of the permeator. Permeators containing hollow fiber membranes have found acceptance for use in desalination, ultrafiltration, and hemodialysis. In general, these separation operations provide relatively mild environments, i.e., the processed streams contain little, if any, concentrations of moieties which may adversely affect the material of the tube sheet (e.g., by loss of physical strength or integrity or by swelling). Moreover, in operations such as hemodialysis in which little if any pressure differential is exerted across the tube sheet, the strength of the tube sheet is not a prime consideration. Accordingly, a wide freedom of choice exists in selecting the resin for fabricating the tube sheet. For example, the aspects of strength and chemical resistance can be sacrificed to avoid high polymerization temperatures (e.g., exotherms), in order to provide a desirably fluid liquid resin for penetration into a previously assembled bundle of hollow fiber membranes, and to ensure good adherence of the tube sheet to the hollow fiber membranes. Even with such permeators which operate under relatively mild conditions, considerable difficulty may still be experienced in obtaining a suitable resin for forming a tube sheet. These difficulties clearly become more severe when the tube sheet must exhibit high strength and high chemical resistance.

For instance, in view of the benefits which can be provided by fluid separations effected by membranes, it is desired to provide tube sheets which will enable permeator technology to be utilized in harsher environments such as gaseous purge streams and liquid waste streams from, e.g., chemical plants or refineries, which can contain moieties which are often deleterious to resinous materials. Such tube sheets should exhibit high strengths in order to withstand the high pressure differentials (often exceeding 30 or 40 or even 60 atmospheres) which may be required to obtain advantageous permeate flux through the walls of the hollow fiber membranes. Moreover, the tube sheet should retain its strength and dimensional stability over the long periods of operation (e.g., two or more years) which are desired for permeators.

A wide variety of resins have been proposed for preparing tube sheets for hollow fiber membranes. For instance, Geary, et al., in U.S. Pat. No. 3,499,062, issued Mar. 3, 1970, suggest the use of solders, cements, waxes, adhesives, natural and synthetic resins. McLain in U.S. Pat. No. 3,422,008, issued Jan. 14, 1969, disclose the use of epoxy resins for forming tube sheets and suggest that phenol-aldehyde resins, melamine-aldehyde resins, thermosetting artificial rubbers, and acrylic resins may also be suitable. Other materials which have been disclosed for use as materials for forming tube sheets include urethane resins, silicone resins, polysulfides, acetals, cellulosics, fluorocarbons, vinyls, styrenes, polyethylene, and polypropylene. See, for instance, U.S. Pat. Nos. 3,760,949, issued Sept. 25, 1973; 4,049,765, issued Sept. 20, 1977; and 4,138,460, issued Feb. 6, 1979.

One of the more preferred resins for forming tube sheets is the epoxy resins. For example, Schrader in U.S. Pat. No. 3,728,425, issued Apr. 17, 1973, discloses the use of polyepoxides for fabricating tube sheets for permeators. He suggests that the polyepoxides include glycidyl polyethers of polyhydric phenols such as resorcinol, catechol, hydroquinine, phloroglucinol, 2,2-bis(4-hydroxyphenyl) propane (biphenol A), 4,4'-dihydroxybenzophenone, 1,1-bis(4-hydroxyphenyl) ethane, bis(2-hydroxynaphthyl) methane, 2,2-bis(4-hydroxyphenyl) butane, 4,4'-dihydroxyphenyl phenylsulfone, and condensation products of phenolformaldehyde (to produce novolac resins). Most commonly, the specifically disclosed epoxy resin comprises a diglycidyl ether of bisphenol A (hereafter DGEBA).

A curing agent is employed with the epoxy resin. McLain, for instance, specifically discloses the use of 1.1 parts of dimethylamino propylamine and 6.8 parts of soya-1,3-propylene diamine as the curing agent for 14.7 parts of DGEBA. Schrader requires an aromatic amine as the curing agent. His suggestions for aromatic amine curing agents include meta-phenylene diamine, diamino diphenyl sulfone, 4,4'-methylene dianiline, 2,6-diaminopyridine, 4-chloro-ortho-phenylenediamine, and the adduct of meta-phenylene diamine and methylene dianiline with phenyl glycidyl ether (known as Curing Agent Z and disclosed in U.S. Pat. No. 3,339,633). Schrader apparently prefers Curing Agent Z. Curing Agent Z has a relatively low viscosity, which facilitates formulating the liquid resin and provides a liquid resin of suitably low viscosity for forming a tube sheet. However, Curing Agent Z has been identified as a suspected carcinogen in animals. Furthermore, the near stoichiometric amounts of Curing Agent Z which are required, e.g., about 20 parts by weight per hundred parts by weight of resin (phr) increases the amounts required to be processed in fabricating the tube sheet. Moreover, although aromatic polyamines such as Curing Agent Z are often characterized as providing enhanced strength and chemical resistance to epoxies, there is no basis to assert that Curing Agent Z, when formulated into a liquid suitable for forming a tube sheet, would provide sufficient chemical resistance to the tube sheet such that the tube sheet could withstand the harsher environments which may be present in gaseous purge streams and liquid waste streams from, e.g., chemical plants or refineries.

Considerable amounts of research have been conducted and much literature has been published on general epoxy technology. See, for instance, Lee and Neville, *Handbook of Epoxy Resins*, 1967, "Epoxy Resins", *Encyclopedia of Polymer Science and Technology*, Volume 6, pages 209 to 271 (1967), and May and Tanaka, *Epoxy Resins—Chemistry and Technology*, 1973. Epoxy resins have found widespread applications in coatings, bonding, electrical encapsulating, tooling, flooring, castings, and the like. Various of these applications may require that the epoxy exhibit different properties, e.g., in terms of strength, ease of processing, time for curing, heat distortion resistance, and the like. Accordingly, many different epoxy resins and curing agents are commercially available in order to meet the specific needs for a particular application. For example, the product bulletin of Shell Chemical Company entitled *EPON ® Resins for Casting* (1967) lists in Table II (appearing between pages 10 and 11) twenty four curing agents. Commonly employed curing agents usually can be characterized as amines, anhydrides and Lewis Acids. One of the available curing agents is 2-ethyl-4-methylimidazole. Although general properties and effects can be attributed to various epoxy resin and curing agents, these general properties and effects usually only serve to provide a guide to select candidates for empirical screening to determine suitability for the intended use of the epoxy resin.

In accordance with this invention, permeators containing hollow fiber membranes are provided which have tube sheets which exhibit high strength and excellent chemical resistance yet the tube sheets can be fabricated without undue risk of damage to the hollow fiber membranes. Moreover, the tube sheets can be readily and easily fabricated, and the fabricator need not be exposed to unduly toxic materials during the fabrication of the tube sheet. The tube sheets of the permeators of this invention comprise a cured epoxy resin of a liquid resin comprising polyglycidyl resin and an imidazole curing agent. The liquid resin can be applied to the hollow fiber membranes in any suitable manner to form the tube sheet and then cured to solidify the resin.

The imidazole curing agents which may be useful in preparing the tube sheets of this invention can be represented by the following structural formula

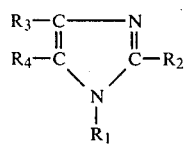

wherein $R_1$, $R_2$, $R_3$, and $R_4$ may be the same or different and are hydrogen, alkyl (e.g., of 1 to about 12 carbons, preferably lower alkyl of 1 to about 4 or 6 carbon atoms), lower acyl (e.g., of 1 to about 4 or 6 carbon atoms), and aryl-containing (e.g., mono and bicyclic aryl and aralkyl of 6 to about 15 carbon atoms). Additionally, $R_2$, $R_3$ and $R_4$ may be halogen (e.g., chlorine, fluorine or bromine), nitro, hydroxy, alkoxy (e.g., alkoxy of 1 to about 6 carbon atoms), or the like. Furthermore, $R_3$ and $R_4$ may be joined, e.g., to form benzimidazole. Each of $R_1$, $R_2$, $R_3$ and $R_4$ may be substituted, e.g., with hydroxyl or halogen moieties, e.g., fluorine, chlorine and bromine. Exemplary of imidazole curing agents are imidazole, N-butylimidazole, 1-acetylimidazole, 1-trifluoroacetylimidazole, 1-perfluorobenzoylimidazole, 1,2-dimethylimidazole, 2-methylimidazole, 2-ethylimidazole, 2-nitroimidazole, 2-ethyl-4-methylimieazole, 2-methyl-5-nitroimidazole, 4-phenylimidazole, 4,5-diphenylimidazole, 4-nitroimidazole, and benzimidazole. Preferably the imidazole curing agent is liquid (including supercooled liquid) at a temperature below about 40° C. or is soluble in the polyglycidyl resin at a temperature below about 40° C., in order to facilitate formulating the liquid resin. Advantageous imidazole curing agents include the substituted imidazoles in which at least one of $R_1$, $R_2$, $R_3$ and $R_4$ is other than hydrogen, e.g., at least one of $R_1$, $R_2$ and $R_3$ is alkyl, acyl, or aryl (including aralkyl). A preferred imidazole curing agent is 2-ethyl-4-methylimidazole. 2-Ethyl-4-methylimidazole (e.g., about 92% pure) is a supercooled liquid at room temperature and has a viscosity of about 4000 to 6000 centipoise at room temperature. Although, e.g., 2-ethyl-4-methylimidazole has a higher viscosity than some of the heretofore proposed curing agents such as Curing Agent Z, the imidazole curing agent provides a sufficient working time with the liquid resin, even at slightly elevated temperatures, before the viscosity of the liquid resin begins to significantly increase due to curing. Often, the viscosity of the liquid resin may decrease at a given temperature for a period subsequent to its formulation in order to facilitate, say, penetration within a bundle of hollow fiber membranes. Moreover, not only has it been found that the imidazole curing agent may provide the low viscosities necessary for achieving this penetration of the liquid resin, but also, the flow properties (rheology) of the liquid resin may be suitable to achieve penetration through the bundle of hollow fiber membranes without the use of enhanced forces such as provided by centrifugal casting. Clearly, a liquid resin which is highly thixotropic may provide a highly uneven tube sheet without good penetration within the bundle of hollow fibers. A further advantage is that unduly high peak exotherm temperatures can be avoided since the liquid resin containing the imidazole curing agent may need to be heated, e.g., about 40° C. or higher, to initiate a rapid curing reaction which would tend to develop high temperatures due to the exothermic curing reactions. With a significant portion of the curing occurring at lower temperatures, the ease of maintaining a relatively uniform temperature profile throughout the mass of resin during curing is enhanced. While the imidazole curing agent may not eliminate wicking, the amount of wicking is generally not excessive. Moreover, since good penetration of the liquid resin can often be achieved throughout the bundle, the height of wicking across the cross-section of the bundle can be relatively uniform.

A significant advantage of the imidazole curing agents is the ability to vary the extent of any exotherming of the liquid resin during curing by changes in the amount of the imidazole utilized. Imidazole curing agents believed to not only react with epoxy moieties through one or both of the ring nitrogens but also catalyze reactions between (1) an alkoxide ion formed by reaction of the epoxy moiety with a ring nitrogen of the imidazole curing agent and (2) another epoxy moiety. Farkas, et al., in "Imidazole Catalysts in the Curing of Epoxy Resins", *Journal of Applied Polymer Science*, Volume 12, pages 159 to 168 (1968), herein incorporated by reference, provide a more detailed disclosure of the manner in which epoxy moieties are believed to react with imidazole compounds. Accordingly, since the imidazole curing agent can provide two mechanisms for curing an epoxy resin, the relative amount of the imidazole curing agent employed can influence the relative portions of these mechanisms which occur in curing the epoxy resin. For instance, lesser amounts of imidazole curing agent per given amount of epoxy resin would tend to promote more cross-linking through the alkoxide ion route; whereas with greater amounts of imidazole curing agent, more of the epoxy moieties are consumed by reaction with the imidazole nitrogens, and hence less epoxy moieties are available for cross-linking with any alkoxide ions which may be present. It has been generally found that with greater amounts of imidazole curing agent, less exotherming occurs. Therefore, an amount of the imidazole curing agent can be chosen in order to provide a peak temperature which can be tolerated by the hollow fiber membranes with sufficient cross-linking to provide advantageous strength and chemical resistance properties to the tube sheet.

Accordingly, by this invention imidazole curing agents have been found to be particularly advantageous for producing tube sheets for hollow fiber membranes. Thus, not only can tube sheets be produced which exhibit advantageous strength and chemical resistance, but also desirable rheological properties can be achieved by the uncured resin in order to facilitate penetration into a bundle of hollow fiber membranes. Furthermore, the curing rates, degree of curing and peak temperatures generated during curing can be sufficiently flexible in order to enhance the potential for providing a suitable tube sheet.

Frequently, the imidazole curing agent is provided in at least about 1 or 2 percent of that required for complete reaction through one ring nitrogen with the epoxy moieties of the liquid resin on a stoichiometric basis (hereafter "the amount required for stoichiometric reaction"). Often, the imidazole curing agent is provided in an amount of between about 2 to 40, say, about 2 to 30, and preferably about 5 to 20, percent of the amount required for stoichiometric reaction. In common practice, the amount of a curing agent in an epoxy resin is expressed in parts by weight per hundred parts by weight of resin ("phr"). Hence, for the sake of facilitating understanding of the invention, the imidazole curing agent often is utilized in amounts of at least about 1, say, about 2 to 15, especially about 2 to 12, and most frequently about 3 to 7, phr.

Other suitable curing agents and modifiers may be useful in combination with the imidazole curing agent. Examples of curing agents and modifiers include polyamine curing agents and amine modifiers such as isopropyl amine, polymethylenediamines, polyalkyletherdiamines, dialkylenetriamines (e.g., diethylenetriamine), trialkylenetetramines (e.g., triethylenetetramine), diethylaminopropylene, N-aminoethylethanolamine, 1,3-bis(dimethylamino)-2-propanol, menthanediamine, aminoethylpiperazine, 1,3-diaminocyclohexane, bis(p-aminocyclohexyl)methane, m-phenylenediamine, m-xylylenediamine, 4,4'-diaminodiphenylmethane, diaminodiphenylsulfone, piperazine, N-methylpiperazine, piperidine, 2,4,6-tris(dimethylaminomethyl)phenol (DMP-30), tri-2-ethylhexoate salt of DMP-30, modified aliphatic polyamines such as halohydrin ethers of glycol polyamine adducts, dimethamine adducts of alloocimene diepoxide, amino alkoxysilane adducts of propylene oxide, hydroxypolyamines, etc.; acidic curing agents (although generally not preferred since they may be reactive with imidazole curing agents) such as boron trifluoride, aluminum chloride, boron trifluoride monoethylamine, maleic anhydride, phthalic anhydride, chlorendic anhydride, pyromellitic dianhydride, benzophenonetetracarboxylic dianhydride, dodecenyl succinic anhydride, nadic methyl anhydride, tetrahydrophthalic anhydride, hexahydrophthalic anhydride, etc.; amides such as amidopolyamines, fatty polyamines, phosphorus amides (e.g., p-phenylene bis(anilinophenylphosphine oxide)); ureas (including substituted ureas and urea-formaldehydes); N,N-diallylmelamine; triallyl cyanurate; hydrazides; amino acetals such as bis(2-dimethylaminoethoxy)methane, bis(1-dimethylamino-2-propoxy)methane, 1,6-bis(2-dimethylaminoethoxy)hexane, α,α'-bis(2-dimethylaminoethoxy)-p-xylene, bis(3-dimethylamino-1-propoxy)methane, 2,6-bis (2-dimethylaminoethoxy)pyridine, 2,6-bis(1-dimethylamino-2-propoxy)pyridine, 2,6-bis(3-dimethylamino-1-propoxy) pyridine, bis(2-dimethylaminoethoxy)methane, bis(2-N-morpholinoethoxy)methane, 1,1-bis(2-dimethylaminoethoxy) propane, 2,2-bis(2-dimethylaminoethoxy)propane, α,α'-bis (2-dimethylaminoethoxy)toluene, 1,1-bis(2-dimethylaminoethoxy)butane, 1,1-bis(2-dimethylaminoethoxy)ethane, and 1,1,2,2-tetrakis(2-dimethylaminoethoxy)ethane; and the like.

When one or more other during agent is used in a curing composition in conjunction with the imidazole curing agent, it is preferred that the total reactive sites (the imidazole curing agent is considered to have one reactive site on its ring) provided on the curing agents be less than about 30 or 40 percent, say, about 5 or 10 to 30, of the amount required for stoichiometric reaction. Usually, the imidazole curing agent is in an amount of at least about 1, say, about 2 to 20, percent of that required for stoichiometric reaction. Usually, therefore, the other curing agent is utilized in an amount of less than about 10 to 12 phr, say, about 1 or 2 to 10, phr, and the imidazole curing agent is used in an amount of at least about 2, say about 2 to 6, phr. Most frequently, the imidazole curing agent comprises at least about 40, say, about 50 to 95, percent by weight of the total curing composition.

A particularly attractive advantage provided by the imidazole curing agents is the capability of utilizing a wider range of polyglycidyl resins in fabricating tube sheets. Hence, the polyglycidyl resin may be selected primarily to facilitate preparing the tube sheets, e.g., in terms of low viscosity, low wicking, low shrinkage, high adherence, and low solvating effect on the hollow fiber membranes, yet the imidazole curing agent can enable the tube sheet to be formed without undue exotherming and can provide a tube sheet which exhibits desired strength and chemical resistance.

The polyglycidyl resin of the liquid resin preferably contains one or more diglycidyl compounds (including glycidyl-terminated prepolymers). If desired, the polyglycidyl resin may also contain tri- or higher functionality glycidyl compounds. The triglycidyl and higher functionality compounds (e.g., novolacs) are generally not required to provide advantageous strength and chemical resistance to the tube sheets since the imidazole curing agent often provides adequate cross-linking to achieve the desired properties. However, when employed, the triglycidyl and higher functionality compounds frequently comprise less than about 10, e.g., less than about 5, say, about 0.01 to 2, percent by weight of the polyglycidyl resin. Usually, the diglycidyl compounds comprise at least about 75, say, about 90 or 95 to essentially 100, percent by weight of the polyglycidyl resin.

The polyglycidyl resins useful in providing the tube sheets of this invention are often obtained as the glycidyl product of a reaction between a glycidyl group-forming compound, for instance an epihalohydrin, such as epichlorohydrin, and an organic compound. Illustrative of such glycidyl product reactions, for instance, are those involving epichlorohydrin which occur in two steps: (1) the formation of a chlorohydrin intermediate and (2) the dehydrohalogenation of the intermediate to the glycidyl compound. Such reactions are generally described in the literature of the epoxy art; see, for instance, Lee and Neville, Handbook of Epoxy Resins, 1967.

The polyglycidyl resins can be generally characterized by the presence of a plurality of glycidyl groups of the following general structure:

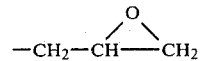

The organic compounds forming the polyglycidyl resin may be aliphatic hydrocarbons, may contain aromatic hydrocarbon groups or may even have a heterocyclic ring structure. The organic compounds may be characterized as having active-hydrogen groups, for instance, alcohol or amine groups, where the hydrogen is replaced by the glycidyl group. Such active-hydrogen alcohol and/or amine groups may even be present in a heterocyclic configuration, for instance, as a triazine or hydantoin.

Among the more preferred polyglycidyl resins useful in providing the tube sheets of this invention are any of those polyglycidyl resins comprising the glycidyl reaction product of a glycidyl-forming compound, such as epichlorohydrin, with any of the compounds selected from among bisphenol-A, resorcinol, catechol, hydroquinone, phloroglucinol, 4,4'-dihydroxybenzophenone, 1,1-bis(4-hydroxyphenyl)ethane, bis(2-hydroxynaphthyl)methane, 2,2-bis (4-hydroxyphenyl)butane, 4,4'-dihydroxydiphenyl sulfone, ethylene glycol, propylene glycol, butanediol, pentanediol, isopentanediol, linoleic dimer acid, poly(oxypropylene) glycol, 2,4,4'-trihydroxybisphenyl, 2,2',4,4'-tetrahydroxybisphenyl, bisresorcinol F, 2,2',4,4'-tetrahydroxybenzophenone, bisphenolhexafluoroacetone, aniline, para-aminophenol, isocyanuric acid, hydantoin, 1,1',2,2'-tetra (p-hydroxyphenyl)ethane, phenol-formaldehyde novolac, o-cresol-formaldehyde novolac, cycloaliphatic alcohols and mixtures thereof. These reactant compounds may be substituted, for instance, with hydroxyl groups or halogen groups, such as fluorine, chlorine and bromine. One such substituted organic compound is tetrabrominated bisphenol-A.

More preferably, the polyglycidyl resin comprises the glycidyl reaction product of a glycidyl-forming compound, such as epichlorohydrin, with phenol-formaldehyde novolac or bisphenol-A. The polyglycidyl resin reaction product based on a phenol formaldehyde novolac is sometimes referred to as a polyglycidyl ether of bisphenol-F, as a bisphenol-F epoxy resin or a polyglycidyl ether of phenol formaldehyde novolac. Most preferably, the polyglycidyl resin comprises the glycidyl reaction product of bisphenol A and a glycidyl-forming compound. This preferred polyglycidyl resin is commonly referred to as a diglycidyl ether of bisphenol-A (DGEBA), or as a bisphenol-A epoxy resin, and is generally represented as the mixture of diglycidyl polyethers having the chemical structural formula

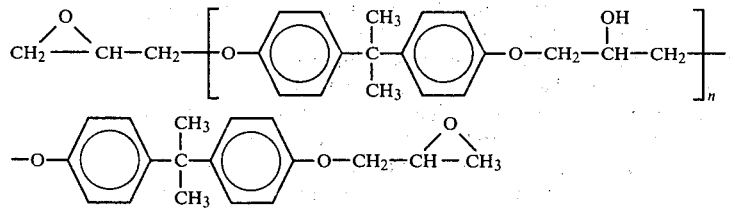

where n is often between 0 and 1, say, between 0.01 and 0.5.

Commonly in the epoxy art, polyglycidyl resins are characterized in terms of "epoxide equivalent" or "epoxy equivalent weight" which is the weight of the polyglycidyl resin in grams which contains one gram equivalent of epoxy. Hence, in a diglycidyl compound, the "epoxy equivalent weight" would be one-half the molecular weight of the compound. Frequently, the polyglycidyl resins used in preparing the tube sheets of this invention have "epoxy equivalent weights" of about 75 to 300, say, about 125 to 250, and most often about 150 to 200 grams. Some attractive polyglycidyl resins have "epoxy equivalent weights" of about 165 to 185 grams. Generally, an important consideration in the selection of a polyglycidyl resin is to ensure that the liquid resin has appropriate rheological properties (viscosity and flow properties) to enable fabrication of a tube sheet. Hence, a polyglycidyl component will often be chosen such that it has a "epoxy equivalent weight" to provide a liquid resin having suitable rheological properties.

The liquid resin may also contain a monoglycidyl compound and often commercially-available polyglycidyl resins contain as impurities or as additives, monoglycidyl compounds. Monoglycidyl compounds often serve to reduce the viscosity of the liquid resin. Since monoglycidyl compounds are reactive with the curing agent, they become incorporated into the cured epoxy structure. The monoglycidyl compounds also serve to terminate the curing reactions, hence, in circumstances in which high strength and chemical resistance of the tube sheet is essential, it is preferred that any monoglycidyl compounds be less than about 10, say, essentially 0 to 5, percent by weight of the polyglycidyl resin. Examples of monoglycidyl compounds are butane glycidyl ether, pentane glycidyl ether, phenyl glycidyl ether, glycidyl ether of 2-ethoxyhexanol, etc.

The liquid resin may contain other polymeric materials such as, e.g., phenolic resins, polycarbonates, polysulfones, polyimides, polyamides, etc.; however, these polymeric materials preferably are present in an amount less than about 50, say, less than about 30, e.g., about 0 to 10, weight percent of the polyglycidyl resin. The liquid resin may contain other components such as plasticizers, bond promoting agents, cure accelerators, thickening agents, dyes, pigments, and inorganic or organic fillers. Plasticizers include phthalate esters (e.g., dioctylphthalate), tricresyl phosphate, and the like. Bond promoting agents include the tertiary amines such as benzyl dimethyl amine, N-methyl morpholine, dimethylaminopropylamine, and the like. Accelerators include resorcinol, nonyl phenol, bisphenol-A, triphenyl phosphate, toluene sulfonic acid, lactic acid, salicylic acid, and the like. Thickening agents include very finely divided solids such as colloidal silica, clays, and the like. Fillers can be utilized to reduce the amount of polyglycidyl resin needed per unit volume of liquid resin. When employed, the fillers may often comprise up to about 70, say, about 2 to 60, e.g., about 5 to 50, volume percent of the liquid resin. The fillers should not be of such small particle size or high surface area per unit volume that the viscosity of the liquid resin is unduly high. Accordingly, most frequently fillers have an average particle diameter of at least about 2 or 5 microns, e.g., about 5 to 150 or 200, microns. Fillers may include inorganics such as silica, alumina, aluminum, iron, iron oxide, ceramics, etc.; chemically combined inorganic and organics such as organic modified silicas; or organics such as solid polymers including phenolics, polycarbonates, polyurethanes, polyureas, polysulfones, etc. The filler should not unduly settle from the liquid resin during the fabrication of the tube sheet. Preferably, the density of the filler is less than about 7, say, about 1 to 5, grams per cubic centimeter. In copending U.S. patent application of A. K. Fritzsche, H. P. Holladay, and M. L. Woodcock Ser. No. 209,807, a contination-in-part of U.S. patent application Ser. No. 109,425, filed Jan. 3, 1980, now abandoned, filed concurrently herewith, herein incorporated by reference, methods are disclosed for utilizing liquid resins containing fillers for forming tube sheets.

Preferably, the liquid resin has a viscosity sufficient to maintain the filler in suspension for at least a time sufficient to form the liquid resin in substantially the shape of the tube sheet. If desired, the curing composition can comprise at least one other curing agent than the imidazole agent which other curing agent has a greater reactivity with the glycidyl moieties than does the imidazole curing agent. The other curing agent is preferably not reactive with the imidazole curing agent. The other curing agent of the curing composition is provided in an amount sufficient to increase the viscosity of the liquid resin to maintain the filler in suspension without undue settling prior to the remaining curing of the resin with the imidazole curing agent. Hence, the viscosity of the liquid resin may be sufficiently low in order to fabricate the tube sheet and the viscosity of the liquid resin can be quickly increased after the liquid resin has been placed into the form of the tube sheet to avoid undue settling of the filler. The amount of the other component in the curing agent is preferably insufficient to result in undue exotherming of the resin and to unduly detract from the cross-linking provided by the imidazole curing agent. Frequently, the weight ratio of the other curing agent of the curing composition to the imidazole curing agent is about 0.01:1 to 1:1, say, about 0.1:1 to 0.75:1. Any suitable curing agent may find use as the other curing agent of the total curing composition. Generally, polyamine and modified polyamine curing agents are preferred.

The liquid resin may be formed into the tube sheet in any suitable manner. For instance, the liquid resin can be placed on the end portions of a plurality of hollow fiber membranes and the hollow fiber membranes then assembled into the form of a bundle such as disclosed in U.S. Pat. Nos. 3,455,460 (Mahon) and 3,690,465 (McGinnis, et al.), herein incorporated by reference. In this type of assembly, the end portions of the hollow fiber membranes join to form an integral resinous tube sheet. Generally, in these methods, it is preferred that the liquid resin exhibit a viscosity of about 5000 to 100,000, preferably, about 5000 to 50,000 centipoise at 25° C. Thickening agents are often desirable to produce a sufficiently thixotropic mixture such that undue flowing of the liquid resin does not occur when it is placed on the end portions of the hollow fiber membranes. For example, the thickening agent may be utilized in an amount of 0.01 to 0.5 weight percent of the liquid resin.

A more preferred method for forming the tube sheet is casting the liquid resin around a previously formed bundle of hollow fiber membranes due to simplicity of the method and its freedom from complex fabrication equipment. In these methods, for instance, a bundle of hollow fiber membranes is placed in a mold with generally either the end of the bores of the hollow fiber membranes sealed or the hollow fiber membranes looped such that liquid resin is not drawn into the bores. The liquid resin can then be introduced into the mold and thus cast in substantially the configuration of the tube sheet. The resin is then solidified. When the liquid resin is cast to form the tube sheet, it is preferred that the viscosity of the liquid resin be less than about 15,000; often about 200 or 500 to 15,000, e.g., about 500 to 12,000, centipoise at 25° C. The casting may be conducted at an elevated temperature to reduce the viscosity of the liquid resin; however, excessively high temperatures can accelerate the curing reactions of the resin and may result in undesirable temperatures being generated due to a rapid rate of curing. Therefore, the temperature of the liquid resin during casting is often less than about 45° C., say, about 15° to 40° C.

Any suitable curing schedule for the resin may find application in preparing the tube sheets of this invention. In many instances, the curing of the liquid resin proceeds in three steps: first, initiating of curing; second, solidification; and third, final cross-linking. In these instances, the conditions to which the resin is subjected during curing can affect the curing rate, the peak temperature achieved during curing by the resin, and the degree of cross-linking of the resin. Frequently, even though curing may initiate at ambient temperature, e.g., 10° to 30° C., heat may desirably be supplied to the liquid resin at the initial stage of curing in order to assist in initiating the curing reactions. The temperature is preferably below that temperature at which the rate of reaction becomes so fast that most of the heat generated can not be dissipated and unduly higher temperatures are produced which even further accelerate the rate of reaction. This phenomenon is referred to herein as exotherming and the peak temperature during curing is referred to as the peak exotherm temperature. The rate at which the curing is initiated may affect the peak temperature which is achieved during the exotherm. Preferably, the temperature of the liquid resin during the cure initiation stage is such that undesirable peak exotherm temperatures are not produced. The peak exotherm temperature of the curing reaction should be below the temperature at which the hollow fiber membranes are unduly adversely affected, e.g., in terms of strength, chemical resistance, and/or permeation properties. Frequently, the peak exotherm temperature of the curing reaction is at least 10° C. or 20° C. below the glass transition temperature of the hollow fiber membrane. When heat is supplied, usually the temperature of the liquid resin is up to about 45° C., e.g., about 25° C. or 30° to 40° C.

The solidifying stage of the curing reaction is usually conducted at elevated temperatures due to the heat generated during the curing reactions. If necessary, heat may be supplied to the curing resin to provide a desirable rate of reaction; however, once initiated, the curing reactions usually proceed to solidification of the resin without the need to supply heat. Advantageously, the peak temperature during solidification is at least 10° C. or 20° C. below the glass transition temperature of the hollow fiber membrane. Sometimes, the peak exotherm temperature during solidification is less than about 100° C., e.g., less than about 90° C., say, about 25° to 90° C.

As the curing reaction approaches completion, the curing reaction slows down since the concentration of reactants is substantially reduced. In the final cross-linking stage, which is optional, the temperature of the resin is increased to, e.g., promote reactant mobility and achieve additional cross-linking (curing). This additional cross-linking may provide a substantial increase in the strength and chemical resistance properties of the tube sheet even though the amount of cross-linking is small. Generally, the temperatures employed for final cross-linking are at least as high as the peak temperature during the solidification but below about 10° C. or 20° C. below the glass transition temperatures of the hollow fiber membranes. With highly temperature stable hollow fiber membranes the curing mass may be up to about 150° C. or 170° C.; however, most frequently, the temperatures is about 40° C. to 80° C. or 100° C. The duration of the heating during the final cross-linking stage of the curing reactions is generally dependent upon the desired degree of cross-linking. With excessive cross-linking, the tube sheet may be undesirably brittle. Frequently, the duration of this heating is sufficient to provide a substantially uniform temperature throughout the tube sheet. Often the duration is at least about 1, say, at least about 2, hours. Duration in excess of about 24 or 36 hours may be less desired due to the time required in the fabrication of the tube sheet. Preferably, the duration of this heating is about 1 to 24, say, about 1 to 16, hours.

After forming the tube sheet, e.g., by assembling a bundle of hollow fiber membranes having liquid resin at the end portion or by casting, the tube sheet is generally severed to expose the bores of the hollow fiber membranes.

The liquid resin can be formulated with a wide selection of polyglycidyl resins and adjuvants in order to provide tube sheets exhibiting highly advantageous properties, i.e., high strength, good chemical resistance, low and uniform wicking, etc., while still being capable of fabricating acceptable tube sheets without risk of damage to the hollow fiber membranes. For example, the tube sheets of this invention can exhibit highly advantageous strength and chemical resistance properties. For example, tube sheets prepared from a diglycidyl ether of bisphenol A and 2-ethyl-4-methylimidazole can exhibit virtually no volume change when exposed to liquid ammonia, toluene, xylene, or diethylbenzene. Tensile strengths of at least about 350 or 400 kilograms per square centimeter can be achieved. The tube sheet can be rigid, i.e., exhibit sufficient strength that it retains its configuration under stress. Often, the cured resin exhibits a Shore A hardness (ASTM D 2240) of at least about 70, say, at least about 80 or 90, and often up to about 120 or 130. The shrinkage of the resin during curing is generally less than 2 or 3 volume percent. If shrinkage of the resin during curing, even though minor, is undesirable, additional liquid resin can be added to the solidified resin to provide the desired dimensions and configurations. The resin usually exhibits adequate adherence without undue adverse effect on a wide range of materials suitable for hollow fiber membranes. Since a wide range of curing conditions may be suitable for curing the liquid resin with imidazole curing agents, the curing conditions can be selected to avoid undue stresses in the tube sheet.

Permeators containing hollow fiber membranes in which tube sheets are usually employed are generally characterized by having an elongated tubular shell having at least one open end adapted to receive a tube sheet; an essentially fluid impermeable end closure cap fastened to and covering the elongated tubular shell at the open end, the end closure cap having at least one fluid communication port; a plurality of hollow fiber membranes which are generally parallel and extend longitudinally to form at least one bundle is the elongated tubular shell; a tube sheet having at least one end of each of the hollow fiber membranes embedded therein in a fluid-tight relationship and such that the bores of the hollow fiber membranes are in fluid communication through the tube sheet; and at least one fluid ingress port and at least one fluid egress port communicating through the elongated tubular shell. The elongated tubular shell may be in any suitable cross-sectional configuration to retain the bundle of hollow fiber membranes. Conveniently, the tubular shell has a circular cross-section, and the bundle of hollow fiber membranes substantially fills the cross-section of the tubular shell. However, other cross-sectional configurations may be suitable such as rectangular, oval, free form, or the like.

The permeator may be a single ended or double ended permeator. A single ended permeator has a tube sheet at only one end, and one or both ends of the hollow fiber membranes are embedded in the tube sheet. When only one end of each of the hollow fiber membranes is embedded in the tube sheet, the other end must be plugged or otherwise closed. In a double ended permeator, a tube sheet is provided at each end of the tubular shell, and the hollow fiber membranes may extend from one tube sheet to the other tube sheet, or the permeators may contain at least two distinct bundles of hollow fiber membranes where at least one bundle extends into only one tube sheet. In many instances, a single bundle of hollow fiber membranes is employed in a permeator and at least one end of the hollow fiber membranes in the bundle is embedded in a tube sheet. The opposite end of the hollow fiber membranes may be looped back, i.e., the bundle is generally in a "U" shape, and embedded in the same tube sheet, or the opposite end of the hollow fiber membranes may be plugged or embedded in another tube sheet. When the hollow fiber membranes in the bundle are in a "U" shape, the ends may be segmented such that different regions on the tube sheet contain each end of the hollow fiber membranes. Each of these regions on a tube sheet can be maintained in an essentially fluid impermeable relationship such that the fluid communication between the regions can only occur by passage of fluid through the bores of the hollow fiber membranes.

The permeator may be operated in any desired manner, e.g., the fluid feed mixture may be introduced into the shell and initially contact the shell side of the hollow fiber membranes, or it may be introduced into the bores of the hollow fiber membranes. The flow pattern of the fluid on the shell side of the hollow fiber membranes may be primarily transverse to the longitudinal orientation of the hollow fiber membranes or may be primarily axial to the orientation of the hollow fiber membranes. When the flow on the shell side of the hollow fiber membranes is axial, it may be generally concurrent or countercurrent with the flow in the bores of the hollow fiber membranes.

The tube sheets are in a fluid tight relationship with respect to the tubular shell. This fluid tight relationship is usually achieved by a sealing means positioned between the tube sheet and at least one of the end closure cap and the tubular shell. For instance, the sealing means can be "O"-rings or gaskets positioned between the side of the tube sheet and the interior surface of the tubular shell such as disclosed by McLain in U.S. Pat. No. 3,422,008; Caracciolo in U.S. Pat. No. 3,528,553; McNamara, et al., in U.S. Pat. No. 3,702,658; and Clarke in U.S. Pat. No. 4,061,574, all herein incorporated by reference. Alternatively, the fluid tight relationship can be provided by positioning an "O"-ring or other gasket between the end face of the tube sheet or lateral projection from the tube sheet and the end closure cap such as disclosed in copending U.S. patent application Ser. Nos. 151,003 (Coleson, et al.), filed May 19, 1980 (a continuation of U.S. patent application Ser. Nos. 972,642, filed Dec. 22, 1978, now abandoned) and 86,211 (Bollinger, et al.), filed Oct. 18, 1979, now U.S. Pat. No. 4,265,763, both herein incorporated by reference. In order to ensure that each of the hollow fiber membranes is embedded in the tube sheet and to provide regions in tube sheet of sufficient thickness to, e.g., receive "O"-rings or other gaskets for sealing, the peripheral dimensions of the tube sheet usually extend outside of the zone of the tube sheet through which the bundle of hollow fiber membranes passes. Thus, the tube sheet will contain a region having a high population of hollow fiber membranes and a region having a relative absence of hollow fiber membranes. These regions may exhibit, e.g., different curing properties including different peak exotherm temperatures during the solidification stage of curing due to the difference in resin density between the regions. The liquid resins used to prepare the tube sheets of this invention can enable the region having a relative absence of hollow fiber membranes to be of sufficient size to ensure desired embedding of the hollow fiber membranes and to provide adequate regions to permit the tube sheet to be in a fluid tight relationship. Most desirably, the average peripheral dimension around the tube sheet is at least about 2, say, about 5 to 50, e.g., about 5 to 25, percent larger than the average peripheral dimension of the zone of the tube sheet through which the bundle of hollow fiber membranes passes. In many instances, the difference between these perimeters is about 1 to about 15 or 20 centimeters. The region of the tube sheet containing the hollow fiber membranes may contain a relatively high density of hollow fiber membranes. Usually the density of hollow fiber membranes is described in terms of packing factor which is the percentage of a given cross-sectional area which is occupied by hollow fiber membranes based on the cross-sectional dimensions of the hollow fiber membranes. Advantageously, this invention may enable desirable tube sheets to be prepared which have bundles of high packing factors based on the peripheral dimensions of the bundle in the tube sheet, e.g., packing factors of often at least about 40 to 45 percent, say, up to about 65 or 70 percent, most frequently about 50 to 60 percent.

Frequently, the tube sheet has an average cross-sectional dimension, e.g., diameter with tube sheets having a circular cross-sectional configurations, of at least about 1 or 2 centimeters. While this average cross-sectional dimension may be up to 1 meter or more, many tube sheets have average cross-sectional dimensions of at least about 0.02, preferably, at least about 0.05 to 1.0 meter.

The length of the tube sheet (as determined in a direction parallel to the general orientation of the bundle of the hollow fiber membranes through the tube sheet) is generally sufficient to provide suitable strength for withstanding total pressure differentials to which the tube sheet may be subjected in intended separation operations. Thus, the length employed may depend upon the strength of the resin. Also, the tube sheet should have sufficient length that ample contact is provided between the tubes and the resin such that an essentially fluid tight relationship is ensured. Consequently, the adherence between the tubes and the material of the tube sheet will also affect the desired length of the tube sheets. Often, tube sheets are at least about 2, e.g., about 2 to 100, say, about 2 to 30 or 50, centimeters in length.

The volume of liquid resin employed to make the tube sheets of this invention will vary depending upon the size of the tube sheet and the portion of the volume of the tube sheet occupied by hollow fiber membranes. Frequently, when more than about 1000 or 1500 grams of liquid resin are required to fabricate the tube sheet, the tube sheet is prepared in two or more steps in order to minimize the risk of an unacceptably high peak exotherm temperature during the solidification stage of the curing reaction, or, more preferably, fillers or the like are used to reduce the amount of polyglycidyl resin and curing composition required to form the tube sheet and to absorb heat generated by the curing reactions.

Hollow fiber membranes may be fabricated from any suitable synthetic or natural material suitable for fluid separation or for the support of materials which effect the fluid separations. The selection of the material for the hollow fiber may be based on heat resistance, chemical resistance, and/or mechanical strength of the hollow fiber as well as other factors dictated by the intended fluid separation for which it will be used and the operating conditions to which it will be subjected. The material for forming the hollow fibers may be inorganic, organic or mixed inorganic and organic. Typical inorganic materials include glasses, ceramics, cermets, metals and the like. The organic materials are usually polymers.

Typical polymers which may be suitable for hollow fiber membranes include substituted and unsubstituted polymers selected from polysulfones; poly(strenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides, polyimides, and copolymers of polyamides; polyethers; polyacetal; poly(arylene oxides) such as poly(phenylene oxide) and poly(xylylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes), such as poly(vinyl formal) and poly(vinyl butyral), poly(vinyl amines), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines, etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

One of the preferred polymers for hollow fiber membranes in environments which strength and/or chemical resistance is sought is polysulfone polymers. Particularly, polysulfones having aromatic hydrocarbyl-containing moieties in general possess good thermal stability, are resistant to chemical attack, and have an excellent combination of toughness and flexibility. Useful polysulfones are sold under trade names such as "P-1700", and "P-3500" by Union Carbide, both commerical products are bisphenol methane-derived polysulfones (specifically, bisphenol A-derived) having a linear chain of the general formula

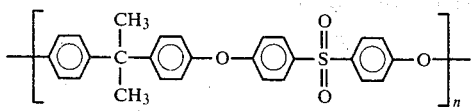

where n, representing the degree of polymerization is about 50 to 80. Other useful polysulfones are sold under the trade name "ASTREL 360 PLASTIC" by the 3M Company. Poly(arylene ether) sulfones are often advantageous. Poly(arylene ether) sulfones having the repeating structure

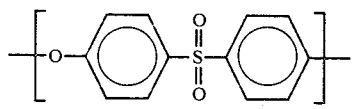

and available from ICI, Ltd., Great Britain, are also useful. Still other useful polysulfones could be prepared through polymer modifications, for example, by cross-linking, grafting, quaternization, and the like.

Another class of polymers which may be attractive for hollow fiber membranes are copolymers of styrene and acrylonitrile or terpolymers containing styrene and acrylonitrile. Frequently, the styrene is up to about 60 or 70, say, about 10 to 50, mole percent of the total monomer in the polymer. Advantageously, the acrylonitrile monomer comprises at least about 20, e.g., about 20 to 90, often about 30 to 80 mole percent of the polymer. Other monomers which may be employed with styrene and acrylonitrile to provide e.g., terpolymers include olefinic monomers such as butene, butadiene, vinyl chloride, and the like. The copolymers or terpolymers of styrene and acrylonitrile often have a weight average molecular weight of at least about 25,000 or 50,000, say, about 75,000 to 500,000 or more. Still other classes of polymers which may be particularly attractive are polymers and copolymers derived from hexamethylenediamine, including copolymers with dicarboxylic acids such as terephthalic acid, and polymers and copolymers of phenylene oxide including substituted poly(phenylene oxide) such as alkyl, alkylbrominated, arylbrominated and reaction products between brominated substituents on poly(phenylene oxide) and primary and secondary nitrogen bases, etc.

The cross-sectional dimensions of the hollow fiber membranes may be selected over a wide range; however, the hollow fiber membranes should have sufficient wall thickness to provide adequate strength, and the bore (lumen) should be sufficiently large as to not result in an unduly high pressure drop to fluids passing in the bore or plugging due to the presence of solids in the fluids passing through the bores. Frequently, the outside diameter of the hollow fiber membranes is at least about 20, say, at least about 30 microns, and the same or different outside diameter fibers may be contained in a bundle. Often the outside diameter of hollow fiber membranes does not exceed about 800 or 1000 microns since such larger diameter hollow fibers may provide less desirable ratios of hollow fiber surface area per unit volume of the permeator. Preferably, the outside diameter of hollow fiber membranes is about 50 to 800 microns, and most desirably, about 150 or 300 to 600 or 800 microns. Generally, the wall thickness of the hollow fiber membranes is at least about 5 microns, and in some hollow fiber membranes, the wall thickness may be up to about 200 or 300 microns, say, about 50 to 200 microns. With hollow fiber membranes fabricated from materials having lesser strength, it may be necessary to employ larger hollow fiber diameters and wall thicknesses to impart sufficient strength to the hollow fiber membrane. The walls of the hollow fiber membranes may be essentially solid or may contain a substantial void volume. When voids are desired, the density of the hollow fiber membrane can be essentially the same throughout its wall thickness, i.e., the hollow fiber membrane is isotropic, or the hollow fiber membrane can be characterized by having at least one relatively dense region within its wall thickness in barrier flow relationship in the wall of the hollow fiber membrane, i.e., the hollow fiber membrane is anisotropic.

The hollow fiber membranes are generally parallelly arranged in the form of one or more bundles in the shell. Generally, at least about 10,000 and often substantially greater numbers, e.g., up to 1 million or more hollow fibers are contained in a permeator. The fibers in the bundle, for instance, may be relatively straight, or they may be spirally wound such as disclosed by McLain in U.S. Pat. No. 3,422,008.

The following examples are provided to further illustrate the invention but not in limitation of the invention. In the examples, all parts and percentages of liquid and solids are by weight and of gases are by volume, unless otherwise indicated.

EXAMPLE 1

Approximately 1500 to 1600 anisotropic hollow fiber membranes about 37 centimeters in length having an exterior skin, an outside diameter of about 450 microns, an inside diameter of about 150 microns, and fabricated from polysulfone (P-3500 available from Union Carbide Corporation) are arranged in a bundle having a generally circular cross-sectional configuration. A section of plastic pipe having an inside diameter of about 2.5 centimeters and a length of about 25 centimeters is placed over one end of the bundle to secure the hollow fiber membranes in the configuration of a bundle having a circular cross-sectional configuration. A similar pipe but having a length of about 2 to 3 centimeters is placed on the other end of the bundle. A gap of about 6 to 7 centimeters exists between the pipes. The region of the hollow fiber membranes in the gap is sprayed with a 2 weight percent solution of Sylgard ™ 184 (a poly(-dimethylsiloxane) available from Dow-Corning Corp.) in isopentane. The shorter piece of pipe is then removed, and the end of the bundle is trimmed with a sharp razor blade to be perpendicular to the orientation of the bundle. A household water proof cement (DU-CO ™ cement available from E. I. duPont de Nemours and Co.) is applied to the end of each of the hollow fiber membranes at the exposed end of the bundle to seal the bores of the hollow fiber membranes. The cement is then dried.

A mold is prepared for casting the tube sheet. The mold has a cavity with a diameter of about 5.6 centimeters and a depth of about 4.4 centimeters. A concentrical bore of about 2.5 centimeters in diameter and 2.5 centimeters in length extends from the cavity. The bottom of the concentrical bore contains an aluminum plug having a thickness of about 0.75 centimeters. The exterior of the mold is surrounded by an electrical heating unit. The mold cavity and the concentrical bore are prepared for the casting by being coated with a silicone-based mold release material. The exposed end of the bundle is inserted into the mold cavity such that the end of the bundle extends into the concentrical bore and contacts the aluminum plug. The mold is heated to about 35° C.

A liquid resin contains about 121.5 grams of a diglycidyl ether of bisphenol A having an epoxy equivalent weight of 185 and a viscosity of about 8500 centipoise at 25° C. (available as EPON ™ 826 from Shell Chemical Company) and 8.5 grams of 2-ethyl-4-methylimidazole having a viscosity of about 6000 centipoise at 25° C. and a purity of about 90 to 92 percent (available from Fike Chemical Company). The liquid resin is poured into the mold cavity and insulation is positioned around the bundle at the top of the mold. The liquid resin sets overnight (about 16 or more hours), and then the temperature of the mold is gradually increased to about 150° C. in about 5 hours. The temperature of about 150° C. is maintained for about 3 hours to effect the desired cross-linking, and then the mold is allowed to cool under ambient room conditions (about 25° C.).

The cast tube sheet is removed from the mold and the projection for the tube sheet caused by the concentrical bore in the mold is severed with a hack saw and then trimmed with an electric planer and then a razor blade to expose the bores of the hollow fiber membranes.

The tube sheet exhibits good strength and chemical resistance. The resin adheres to the hollow fiber membranes.

A particularly useful method for evaluating the potential suitability of a curing composition for use in forming a tube sheet is by casting a mass of the resin which approximates the amount required to form the tube sheet and observe the curing characteristics of the mass of resin. For instance, if relatively low temperatures produce an accelerating rate of reaction which results in an excessively high peak exotherm temperature, the resin may be less desirable. Also, if high temperatures are required to initiate the curing reaction or to effect solidification, the resin may be less desirable. Advantageously, the imidazole curing agents of this invention provides results which can be cured without requiring unduly high initiation temperatures or unduly excessive peak exotherm temperatures. The following examples illustrate the suitability of various polyglycidyl resin and imidazole curing agent-containing compositions for forming tube sheets.

EXAMPLES 2 TO 18

Various polyglycidyl resins and imidazole curing agents are admixed and are cured to determine their suitability for preparing tube sheets. In one aspect, these examples illustrate temperatures at which a rapid acceleration of the curing reactions will occur and hence, the ability of the liquid resin to be substantially cured at temperatures lower than those producing a rapid acceleration of the curing reaction. Thus, for instance, a liquid resin can be substantially cured at a lower temperature, e.g., less than about 35° or 40° C. in the solidification stage and then subjected to further curing in a cross-linking stage at a higher temperature without risk of unduly high peak exotherm temperatures being produced.

The results are provided in Table I. In Table I, the following abbreviations are used.:

826: EPON ™ 826, an unmodified bisphenol-A epoxy resin having a viscosity of about 65–95 poises at 25° C. and an epoxy equivalent weight of about 180 to 190, available from Shell Chemical Company.
828: EPON ™ 828, an unmodified bisphenol-A epoxy resin having a viscosity of about 100–160 poises at 25° C. and an epoxy equivalent weight of about 185 to 192, available from Shell Chemical Company.
XD7818: An epoxy novolac resin available from Dow Chemical Company (bisphenol F epoxy resin)
EMI: 2-ethyl-4-methylimidazole
PDF: bis(2-dimethylaminoethoxy)methane
BDMAP: 1,3-bis(dimethylamino)-2-propanol
TETA: triethylene tetramine
IMD: imidazole
2EI: 2-ethylimidazole
4PI: 4-phenylimidazole
4NI: 4-nitroimidazole
1AI: 1-acetylimidazole
ND: imidazole curing agent not dissolved.
Temperature Program: Temperature of environment and not necessarily the temperature of the resin.

TABLE I

| Example | Polyglycidyl Resin | Wt., grams | Curing Agent and Modifiers | Wt., grams | Approx. Min. Brookfield Visc., Poise | Temperature Program Temperature, °C. | Time, Hours | Peak Exotherm Temperature, °C. |
|---|---|---|---|---|---|---|---|---|
| 2 | 828 | 250 | EMI | 25 | 126 @ 26° C. | 23 | 4.5 | |
| | | | | | | 45 | — | 211 |
| 3 | 828 | 250 | EMI | 37.5 | 81 @ 28° C. | 23 | 24 | |
| | | | | | | 45 | 25 | 72 |
| | | | | | | ~130 | — | 8° above oven temperature |
| 4 | XD7818 | 250 | EMI | 25 | 40 @ 23° C. | 23 | 27 | |
| | | | | | | 45 | — | 170 |
| 5 | 826 | 500 | EMI | 35 | — | 25 | 17 | |
| | | | | | | 40 | — | 230 |
| 6 | 826 | 100 | EMI | 7 | — | 25 | 17 | |
| | | | | | | 40 | — | 210 |
| 7 | 826 | 500 | EMI | 25 | 73 @ 25° C. | 23 | 24 | |
| | | | | | | 45 | — | 236 |
| 8 | 826 | 500 | EMI BDMAP | 20 5 | 79 @ 25° C. | 23 70 | 21 — | 152 |
| 9 | 826 | 500 | EMI TETA | 20 5 | 48 @ 30° C. | 23 48 | 24 — | 208 |
| 10 | 826 | 500 | EMI PDF | 10 15 | 49 @ 25° C. | 25 | — | 172 |
| 11 | 826 | 500 | EMI PDF | 20 5 | 68 @ 25° C. | 25 | — | 138 |
| 12 | 826 | 500 | EMI | 20 | — | 25 | 17 | |

TABLE I-continued

| Example | Polyglycidyl Resin | Wt., grams | Curing Agent and Modifiers | Wt., grams | Approx. Min. Brookfield Visc., Poise | Temperature Program Temperature, °C. | Time, Hours | Peak Exotherm Temperature, °C. |
|---|---|---|---|---|---|---|---|---|
| 13 | 826 | 500 | PDF<br>EMI<br>PDF | 5<br>20<br>5 | — | 40<br>25<br>40 | —<br>96<br>— | 170<br>85 |
| 14 | 826 | 400 | IMD | 20 | 57 @ 28° C. | 40 | — | 290 |
| 15 | 826 | 400 | 2EI | 20 | ND | 40<br>60 | 3<br>— | 290 |
| 16 | 826 | 400 | 4PI | 20 | ND | 40<br>60<br>80 | 4<br>2<br>— | 290 |
| 17 | 826 | 200 | 4NI | 10 | ND | 150 | — | 370 |
| 18 | 826 | 200 | 1AI | 10 | — | 40<br>60 | 14<br>— | 203 |

EXAMPLES 19 to 21

The procedure of Example 1 is substantially repeated to prepare tube sheets, except that polyglycidyl resins and imidazole curing agents listed in Table II are employed, in all examples, the curing agent is about 7 phr.

TABLE II

| Example | Polyglycidyl Resin | Curing Agent |
|---|---|---|
| 19 | EPON TM 8132* | 2-ethyl-4-methylimidazole |
| 20 | EPON TM 826 | 1,2-dimethylimidazole |
| 21 | EPON TM 826 | 1-acetylimidazole |

*EPON TM 8132 is a mixture available from Shell Chemical Company of 80 percent by weight of the diglycidyl ether of bisphenol A having a viscosity of about 170–225 poises at 25° C. and an epoxy equivalent weight of about 190 to 198 and 20 percent by weight of a monofunctional reactive diluent, and has a viscosity of 5 to 7 poises at 25° C. and an epoxy equivalent weight of about 195 to 215.

EXAMPLE 22

A bundle of about 66,000 hollow fiber membranes, which membranes have an exterior skin, an outside diameter of about 560 microns, and are fabricated from polysulfone (P-3500 available from Union Carbide Corporation), is placed into an aluminum mold which has been sprayed with a silicone mold release. The hollow fiber membranes at the end of the bundle placed in the mold are sealed by melting. The mold has a slightly tapered cylindrical upper chamber having approximately a 24.5 centimeter maximum diameter at the top and a 10 centimeter depth and a concentric lower chamber having a 20.3 centimeter diameter and a 7.6 centimeter depth. The mold has a concentric plug hole having a diameter of about 10 centimeters at the bottom. The mold is electrically heated. The bundle is vertically oriented, and the bottom end of the bundle fits into the lower chamber of the mold (about a 55 percent packing factor based on the diameter of the lower chamber) and bows out at the top of the mold. The mold is heated to about 35° C.

A mixture of approximately 5400 grams of EPON$^{TM}$ 826, 600 grams of neopentyl glycol diglycidyl ether, and 3900 grams of finely divided (minus 325 mesh U.S.S.) aluminum powder available as Reynolds #120 aluminum powder from Reynolds Metal Company is prepared and is heated to about 35° C. Approximately 240 grams of Versamid$^{TM}$ 140 (a polyamide reactive resin having a viscosity of about 2 to 6 poises at 75° C. and an amine value of about 370 to 400 and available from General Mills, Inc.) and 210 grams of 2-ethyl-4-methylimidazole (EMI-24$^{TM}$ available from Fike Chemical Company) are separately heated to about 35° C. and then admixed with the mixture containing the polyglycidyl resins to provide the liquid resin. The mixing takes about 5 to 10 minutes, and the liquid resin is poured into the mold. Approximately three or four pours of liquid resin are required to fill the mold cavity since the liquid resin penetrates within the bundle. Approximately 150 grams of the remaining liquid resin is placed into a refrigerator. A thick cord id tied around the bundle above the level of the liquid resin in the mold such that the diameter of the bundle is about 20 to 22 centimeters. The cord is then slipped down the bundle to slightly below the level of the liquid resin.

The mold is maintained at 35° C. for 18 and 20 hours at which time the resin has solidified and has slightly shrunk. The refrigerated liquid resin is placed on top of the solidified resin to top-off the tube sheet. The mold temperature is then increased to 45° C. for two hours, then to 55° C. for two hours, then to 65° C. for two hours, then to 75° C. for two hours and finally to 100° C. for two hours. The mold is allowed to cool to room temperature, and the tube sheet is removed from the mold. The bundle side of the tube sheet evidences a moderate, e.g., less than about 5 centimeters, wicking which is relatively uniform across the bundle.

The portion of the tube sheet formed by the lower chamber is cross-sectionally severed with a hand saw about 3 to 7 centimeters from the portion formed by the larger chamber of the mold to expose the hollow fiber membranes, i.e., form the face of the tube sheet. The face of the tube sheet is then planed with an electric planer and trimmed with a razor-sharp draw knife to ensure that the bores of the hollow fiber membranes are open to fluid flow.

EXAMPLE 23

The procedure of Example 22 is substantially repeated except that an epoxy-silane coupled silica having a surface area of about 2 square meters per gram is used instead of the aluminum powder.

It is claimed:
1. A tube sheet having a plurality of hollow fiber membranes suitable for fluid separations embedded therein, said tube sheet being adapted to be positioned in a fluid tight relationship within a permeator and said tube sheet comprising a cured epoxy resin of a liquid resin comprising polyglycidyl resin and imidazole curing agent having the structure

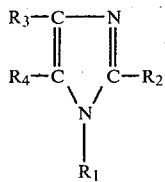

wherein R₁ is hydrogen, alkyl of 1 to about 12 carbon atoms, lower acyl or mono or bicyclic aryl or aralkyl of 6 to about 15 carbon atoms and R₂, R₃ and R₄ are hydrogen, halogen, hydroxy, nitro, alkoxy of 1 to about 6 carbon atoms, alkyl of 1 to about 12 carbon atoms, lower acyl, or mono or bicyclic aryl or aralkyl of 6 to about 15 carbon atoms, said imidazole curing agent being provided in an amount between about 2 to 40 percent of the amount required for complete reaction through one ring nitrogen with the epoxy moieties of the liquid resin on a stoichiometric basis.

2. The tube sheet of claim 1 wherein at least one of R₁, R₂, R₃ and R₄ is other than hydrogen.

3. The tube sheet of claim 2 wherein the imidazole curing agent is 2-ethyl-4-methylimidazole.

4. The tube sheet of claim 1, 2 or 3 wherein the imidazole curing agent is provided in an amount of about 2 to 12 parts by weight per 100 parts by weight of polyglycidyl resin.

5. The tube sheet of claim 1 wherein the polyglycidyl resin comprises a glycidyl reaction product of a glycidyl-forming compound and a compound selected from among bisphenol A, resorcinol, catechol, hydroquinone, phloroglucinol, 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxydiphenyl sulfone, ethylene glycol, propylene glycol, butanediol, pentanediol, isopentanediol, linoleic dimer acid, poly(oxypropylene) glycol, 2,4,4'-trihydroxybisphenyl, 2,2',4,4'-tetrahydroxybisphenyl, bisresorcinol F, 2,2',4,4'-tetrahydroxybenzophenone, bisphenol-hexafluoroacetone, aniline, paraaminophenol, isocyanuric acid, hydantoin, 1,1',2,2'-tetra(p-hydroxyphenyl)ethane, phenol-formaldehyde novolac, o-cresolformaldehyde novolac, or a mixture thereof.

6. The tube sheet of claim 5 wherein the polyglycidyl resin comprises a glycidyl reaction product of a glycidyl-forming compound and bisphenol-A or phenol-formaldehyde novolac.

7. The tube sheet of claim 6 wherein the polyglycidyl resin comprises a mixture of diglycidyl ethers of bisphenol A.

8. The tube sheet of claim 1, 5 or 7 wherein the polyglycidyl resin has an epoxy equivalent weight of about 150 to 200 grams.

9. The tube sheet of claim 1, 3 or 7 wherein the liquid resin contains another curing agent.

10. The tube sheet of claim 1 wherein the liquid resin contains an amino acetal.

11. The tube sheet of claim 10 wherein the amino acetal is bis (2-dimethylaminoethoxy) methane.

12. The tube sheet of claim 1 wherein the hollow fiber membranes are arranged in a bundle and the packing factor of the bundle in the tube sheet based on the peripheral dimensions of the bundle is at least about 45 percent.

13. The tube sheet of claim 1 wherein the tube sheet has a region having a relative absence of hollow fiber membranes and a region having hollow fiber membranes.

14. The tube sheet of claim 12 wherein the average peripheral dimension around the tube sheet is about 5 to 50 percent larger than the average peripheral dimension of the zone of the tube sheet through which the bundle of the hollow fiber membranes passes.

15. The tube sheet of claim 1, 3 or 7 having an average cross-sectional dimension of about 0.05 to 1.0 meter and a length of about 2 to 50 centimeters.

16. The tube sheet of claim 1 wherein the hollow fiber membranes have a diameter of about 150 to 800 microns.

17. The tube sheet of claim 1 or 16 wherein the hollow fiber membranes comprise polysulfone, polyamide, poly(phenylene oxide) or copolymer of acrylonitrile and styrene.

18. In a method for forming a tube sheet having a plurality of hollow fiber membranes suitable for fluid separations embedded therein comprising introducing into a mold the plurality of hollow fiber membranes and a liquid resin and then curing the liquid resin, the improvement wherein the liquid resin comprises polyglycidyl resin and imidazole curing agent have the structure

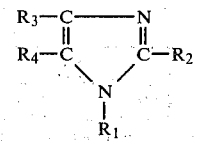

wherein R₁ is hydrogen, alkyl of 1 to about 12 carbon atoms, lower acyl or mono or bicyclic aryl or aralkyl of 6 to about 15 carbon atoms and R₂, R₃ and R₄ are hydrogen, halogen, hydroxy, nitro, alkoxy of 1 to about 6 carbon atoms, alkyl of 1 to about 12 carbon atoms, lower acyl, or mono or bicyclic aryl or aralkyl of 6 to about 15 carbon atoms, said imidazole curing agent being provided in an amount between about 2 to 40 percent of the amount required for complete reaction through one ring nitrogen with the epoxy moieties of the liquid resin on a stoichiometric basis.

19. The method of claim 18 wherein the liquid resin when introduced into the mold, has a viscosity less than 15,000 centipoises at 25° C.

20. The method of claim 18 wherein the liquid resin is introduced into the mold at a temperature less than about 45° C.

21. The method of claim 18 wherein as the curing reaction approaches completion, the temperature of the resin is increased to achieve additional cross-linking.

22. The method of claim 21 wherein the temperature employed for final cross-linking is about 40° to 100° C.

23. The method of claim 18 wherein at least one of R₁, R₂, R₃ and R₄ is other than hydrogen.

24. The method of claim 19 wherein the imidazole curing agent is 2-ethyl-4-methylimidazole.

25. The method of claim 20 wherein the imidazole curing agent is provided in an amount of about 2 to 12 parts by weight per 100 parts by weight of polyglycidyl resin.

26. The method of claim 18 wherein the polyglycidyl resin comprises a glycidyl reaction product of a glycidyl-forming compound and a compound selected from among bisphenol-A, resorcinol, catechol, hydroquinone, phloroglucinol, 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxydiphenyl sulfone, ethylene glycol, propylene glycol, butanediol, pentane-diol, isopentanediol, linoleic dimer acid, poly(oxypropylene)glycol, 2,4,4'-trihydroxybisphenyl, 2,2',4,4'-tetrahydroxybisphenyl, bisresorcinol F, 2,2',4,4'-tetrahydroxybenzophenone, bisphenol-hexafluoroacetone, aniline, para-aminophenol, isocyanuric acid, hydantoin, 1,1',2,2'-tetra(p-hydroxyphenyl)ethane, phenol-formaldehyde novolac, o-cresol-formaldehyde novolac, or a mixture thereof.

27. The method of claim 26 wherein the polyglycidyl resin comprises a reaction product of a glycidyl-forming compound and bisphenol-A or phenol-formaldehyde novolac.

28. The method of claim 27 wherein the polyglycidyl resin comprises a mixture of diglycidyl ethers of bisphenol A.

29. The method of claim 18 wherein the polyglycidyl resin has an epoxy equivalent weight of about 150 to 200 grams.

30. The method of claim 18 wherein the liquid resin contains another curing agent.

31. The method of claim 18 wherein the liquid resin contains an amino acetal.

32. The method of claim 18 wherein the amino acetal is bis(2-dimethylaminoethoxy)methane.

* * * * *